United States Patent
Lindquist et al.

(10) Patent No.: US 7,497,884 B2
(45) Date of Patent: Mar. 3, 2009

(54) FINE ABRASIVE PAPER BACKING MATERIAL AND METHOD OF MAKING THEREOF

(75) Inventors: Gunnard Michael Lindquist, Munising, MI (US); Stella May Boyak, Wetmore, MI (US)

(73) Assignee: Neenah Paper, Inc., Alpharetta, GA (US)

( * ) Notice: Subject to any disclaimer, the term of this patent is extended or adjusted under 35 U.S.C. 154(b) by 562 days.

(21) Appl. No.: 11/027,241

(22) Filed: Dec. 30, 2004

(65) Prior Publication Data

US 2006/0143989 A1    Jul. 6, 2006

(51) Int. Cl.
- B24D 3/00    (2006.01)
- B24D 3/02    (2006.01)
- B24D 11/00   (2006.01)
- B24D 18/00   (2006.01)

(52) U.S. Cl. ............... 51/298; 51/299; 51/295; 51/297; 51/307; 51/308; 51/309; 428/537.5; 427/411

(58) Field of Classification Search ........... 51/307–309, 51/298, 299, 295, 297; 428/480–483, 500, 428/507, 511–513, 515, 537.5; 427/208, 427/208.4, 208.8, 202, 203, 411

See application file for complete search history.

(56) References Cited

U.S. PATENT DOCUMENTS

| | | | |
|---|---|---|---|
| 1,565,027 A | 12/1925 | Okie | |
| 1,581,657 A | 4/1926 | Okie | |
| 1,645,037 A | 10/1927 | Behr, Jr. | |
| 2,595,733 A | 5/1952 | Tone et al. | |
| 3,911,170 A | 10/1975 | Honjo et al. | |
| 4,240,807 A | 12/1980 | Kronzer | |
| 4,248,939 A | 2/1981 | Parsons | |
| 5,043,190 A | 8/1991 | Katsumata et al. | |
| 5,425,965 A | 6/1995 | Tamor et al. | |
| 5,456,734 A * | 10/1995 | Ryoke et al. | 51/295 |
| 5,472,783 A | 12/1995 | Mosser et al. | |
| 5,616,155 A | 4/1997 | Kronzer | |
| 5,984,989 A * | 11/1999 | Davison et al. | 51/298 |
| 6,162,522 A | 12/2000 | Deka et al. | |
| 6,432,485 B1 | 8/2002 | Beyers et al. | |
| 6,432,549 B1 | 8/2002 | Kronzer | |
| 6,613,113 B2 * | 9/2003 | Minick et al. | 51/298 |
| 6,627,260 B2 | 9/2003 | Derderian et al. | |

FOREIGN PATENT DOCUMENTS

| | | |
|---|---|---|
| EP | 0237784 | 9/1987 |
| EP | 0587171 | 3/1994 |

OTHER PUBLICATIONS

TAPPI Test Method T-411 om-97, "Thickness (caliper) of paper, paperboard, and combined board," 1997, 4 pages.
TAPPI Test Method T-479 cm-99, "Smoothness of paper (Bekk method)," 1999, 4 pages.
TAPPI Test Method T-494 om-01, "Tensile properties of paper and paperboard (using constant rate of elongation apparatus)," 2001, 9 pages.
TAPPI Test Method T-538 om-01, "Roughness of paper and paperboard (Sheffield method)," 2001, 5 pages.
TAPPI Test Method T-410 om-02, "Grammage of paper and paperboard (weight per unit area)," 2002, 5 pages.
TAPPI Test Method T-536 om-02, "Resistance of paper to passage of air (high-pressure Gurley method)," 2002, 6 pages.
TAPPI Test Method T-414 om-04, "Internal tearing resistance of paper (Elmendorf-type method)," 2004, 7 pages.

* cited by examiner

*Primary Examiner*—Michael A Marcheschi
(74) *Attorney, Agent, or Firm*—William D. Herrick

(57) ABSTRACT

In one embodiment is provided a method of making an abrasive backing having a smooth surface comprising the steps of providing a paper having a first paper surface and a second paper surface; applying a first synthetic polymeric layer comprising a first synthetic polymeric composition to the first paper surface; and applying a second synthetic polymeric layer comprising a second synthetic polymeric composition to the first synthetic polymeric layer. The method is used to prepare fine abrasive backings having a smooth exterior surface for preparation of fine abrasive papers.

17 Claims, 2 Drawing Sheets

FINE ABRASIVE PAPER BACKING MATERIAL AND METHOD OF MAKING THEREOF

BACKGROUND OF THE INVENTION

Abrasive sheet materials are widely used for a variety of applications and include, by way of illustration only, sandpapers, emery cloths, sanding discs for rotary sanders, and sanding strips for orbital and belt sanders. Abrasive sheet materials most often comprise a layer of an abrasive, i.e., abrasive particles or grit, which is attached to a substrate or base of varying thickness and basis weight by means of an adhesive. By utilizing very fine or super fine abrasive materials (less than 6 microns in average diameter), abrasive sheet materials also can be produced and used for fine sanding and polishing operations.

The reinforcement of paper by latex polymer impregnation (commonly referred to as latex saturation) is a long-established practice. The polymer employed typically is a synthetic material, most often a latex, and the paper may consist solely of cellulosic fibers or of a mixture of cellulosic and noncellulosic fibers. Polymer reinforcement may be employed to improve one or more of such properties as dimensional stability, resistance to chemical and environmental degradation, resistance to tearing, embossability, resiliency, conformability, moisture and vapor transmission, and abrasion resistance, among others.

Latex polymer barrier coatings may also be used to provide a smooth surface for the application of adhesive and abrasive particles. However, during the drying of latex polymer barrier coatings, small holes can appear in the latex layer. The holes appear due to the release of water vapor during drying and contraction of the dried film during curing. These holes are small, 10-30 microns in average diameter and are referred to as pinholes. Pinholes do not become a problem for fine size grit particles as used in the abrasive industry such as from grit 320 to 600 (35-16 microns in average size). However, in super fine grit applications, i.e., grit 800 to 1200 and finer (12 to 1.2 microns), the presence of pinholes affects the quality of the final abrasive paper product. For example, pinholes can allow super fine particles to become trapped or lodged in the holes. Such trapping of particles can result in a clump of abrasive particles on the final product surface. Such clumping creates an uneven surface that results in poor sanding quality.

Therefore, there exists a need in the art for a superfine abrasive paper backing that results in improved uniformity of grit particles on the surface thereof and a method of making thereof.

SUMMARY OF THE INVENTION

In response to the discussed difficulties and problems encountered in the prior art, new abrasive backings, and methods of making such abrasive backings, have been discovered. In one embodiment, a method of making an abrasive backing having a smooth surface includes the steps of: i) providing a paper having a first paper surface and a second paper surface; ii) applying a first synthetic polymeric layer including a first synthetic polymeric composition to the first paper surface; and iii) applying a second synthetic polymeric layer including a second synthetic polymeric composition to the first synthetic polymeric layer. The method may further include the step of supercalendering the abrasive backing after application of the second synthetic polymeric layer to form a smooth surface on the second synthetic polymeric layer. Desirably, the smooth surface exhibits a Bekk Smoothness greater than about 100, and more desirably the smooth surface exhibits a Bekk Smoothness greater than about 1000.

In one aspect, the method may further include the step of applying an amorphous, rubbery polymer film layer to the second paper surface. The amorphous rubbery polymer film layer may be produced, for example, from melt-extrusion, extrusion casting or a preformed film. Desirably, the amorphous rubbery polymer is selected from the group consisting of polyester elastomers and amorphous rubbery polypropylene. More desirably, the amorphous rubbery polymer film layer may demonstrate antislip properties when either dry or wet, and even more desirably the abrasive backing is curl-resistant upon exposure to liquid water.

The paper may be a polymer-reinforced paper. Desirably, the paper may be saturated with a styrene-butadiene and/or a nitrile-butadiene rubber latex.

In another aspect, the method may further include the step of applying a layer of uniformly distributed abrasive particles to the second synthetic polymer layer. The abrasive particles desirably average less than about 6 microns in size. Desirably, the layer of abrasive particles is bonded to the second synthetic polymeric composition by means of a layer of an adhesive. In a further embodiment, the layer of abrasive particles may be coated with a layer of an adhesive.

In a further aspect, the first and/or second synthetic polymeric compositions may include, for example, nitrile and/or polyvinyl chloride lattices. Desirably, the basis weight of the second layer is less than about half the basis weight of the first layer.

In another embodiment, a coated abrasive backing for use in fabricating fine grit abrasive paper includes a paper having first and second surfaces, a first layer including a first synthetic polymer composition contacting the first surface of the paper, a second layer including a second synthetic polymer composition, the second layer contacting the first layer and including a smooth exterior surface. Desirably, the smooth exterior surface exhibits a Bekk Smoothness greater than about 100. More desirably, the smooth surface exhibits a Bekk Smoothness greater than about 1000.

In a further embodiment, a fine grit abrasive paper includes an abrasive backing including a paper having first and second surfaces, a first layer including a first synthetic polymer composition contacting the first surface of the paper, a second layer including a second synthetic polymer composition, wherein the second layer contacts the first layer and includes a smooth exterior surface exhibiting a Bekk Smoothness greater than about 1000, and a layer of fine grit abrasive particles having an average particle size less than about 6 microns.

Other features and aspects of the present invention are discussed in greater detail below.

DEFINITIONS

Figure 1:
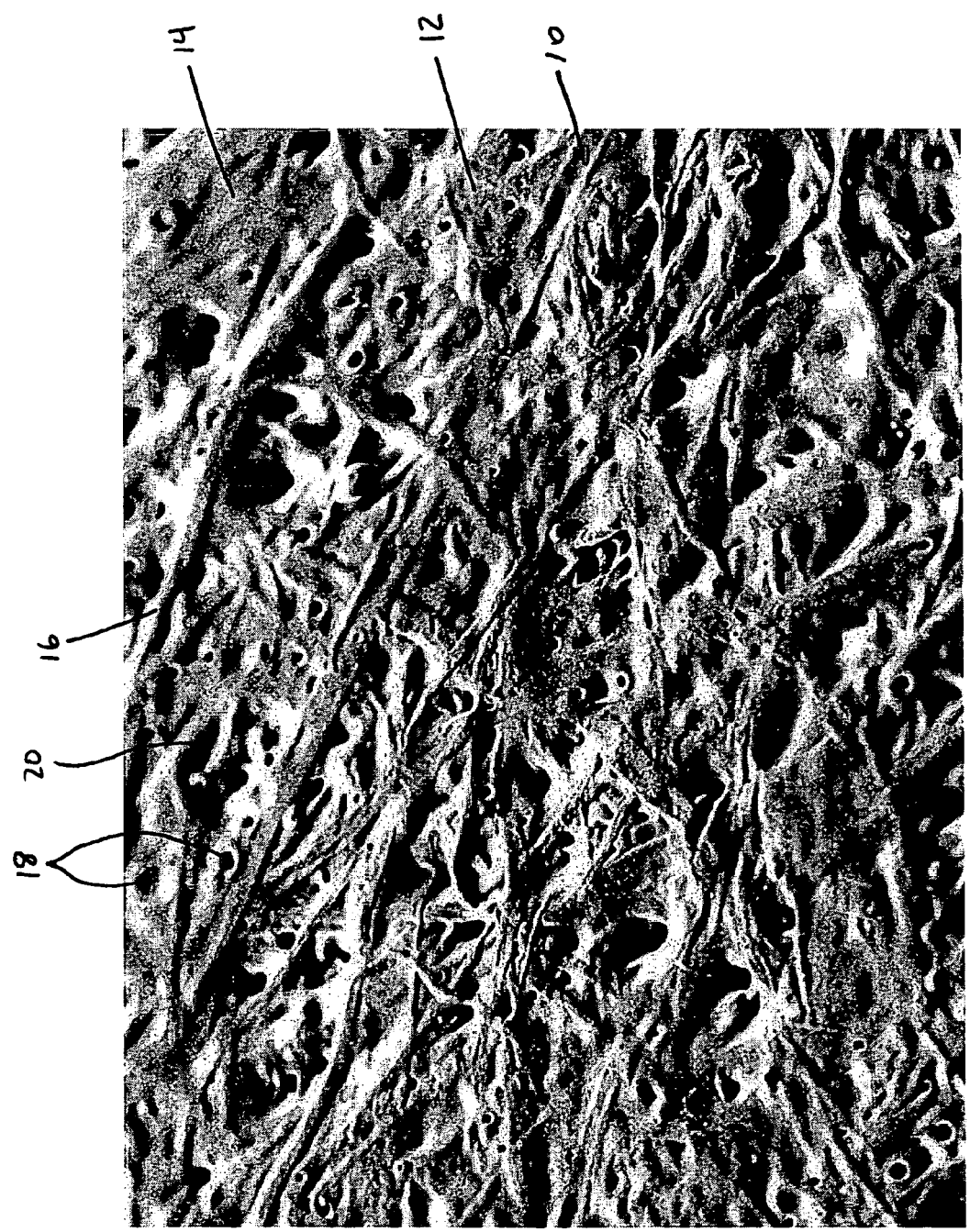
FIG. 1 is a photomicrograph of the coated surface of a single coated abrasive backing.

Within the context of this specification, each term or phrase below will include the following meaning or meanings.

The term "abrasive backing" is used herein to mean a paper, typically a polymer-reinforced paper, which is intended to be provided with a layer of abrasive particles. The term "abrasive paper" refers to the combination of an abrasive backing and a layer of abrasive particles.

As used herein, the term "paper" is meant to include any web or sheet-like material which contains at least about 50 percent by weight of cellulosic fibers. In addition to cellulosic fibers, the web may contain other natural fibers, synthetic fibers, or mixtures thereof. Cellulosic nonwoven webs may be prepared by air laying or wet laying relatively short fibers to form a web or sheet. Thus, the term includes sheets prepared from a papermaking furnish. Such furnish may include only cellulose fibers or a mixture of cellulose fibers with other natural fibers and/or synthetic fibers. The furnish also may contain additives and other materials, such as fillers, e.g., clay and titanium dioxide, surfactants, antifoaming agents, and the like, as is well known in the papermaking art.

As used herein, the term "backside layer" refers to a layer or coating on the backside of an abrasive paper, i.e., the side of the abrasive paper which does not have the layer of abrasive particles thereon.

As used herein and in the claims, the term "comprising" is inclusive or open-ended and does not exclude additional unrecited elements, compositional components, or method steps. Accordingly, the term "comprising" encompasses the more restrictive terms "consisting essentially of" and "consisting of."

DETAILED DESCRIPTION OF THE INVENTION

In accordance with the invention, a paper having first and second surfaces is coated on the first surface with a first synthetic polymer layer, followed by overlaying the first synthetic polymer layer with a second synthetic polymer layer to form a coated paper, followed by supercalendering of the coated paper to form a smooth abrasive backing.

The abrasive backing or paper of the present invention may be prepared from a latex-impregnated paper. By way of illustration only, the latex-impregnated paper may be a water leaf sheet of wood pulp fibers or alpha pulp fibers impregnated with a reactive acrylic polymer latex such as Rhoplex® B-15 available from RohmNova Company, Philadelphia, Pa. However, any of a number of other latexes may be used, if desired, some examples of which include, but are not limited to, polyacrylates, including Hycar® 26083, 26084, 26120, 26104, 26106, and 26322, available from Noveon, Cleveland, Ohio, Rhoplex® HA-8, HA-12, and NW-1715, available from RohmNova Company, and Carboset® XL-52, available from Noveon, Cleveland, Ohio, styrene-butadiene copolymers, including Butofan® NS 278, available from BASF Corporation, Charlotte, N.C., and DL-219, and DL-283, available from Dow Chemical Company, Midland, Mich., ethylene-vinyl acetate copolymers, including Dur-O-Set® E-666, E-646, and E-669, available from National Starch & Chemical Co., Bridgewater, N.J., nitrile rubbers, including Hycar® 1572, 1577, and 1570x55, available from Noveon, poly(vinyl chloride), including Vycar® 352, available from Noveon, poly(vinyl acetate), including Vinac® XX-210, available from Air Products and Chemicals, Inc., Napierville, Ill., ethylene-acrylate copolymers, including Michem® Prime 4990, available from Michelman, Inc., Cincinnati, Ohio and Adcote 56220, available from Morton Thiokol, Inc., Chicago, Ill.

The impregnating dispersion may contain clay and/or an opacifier such as titanium dioxide. Exemplary amounts of these two materials are 16 parts and 4 parts, respectively, per 100 parts of polymer on a dry weight basis.

By way of example only, the paper may have a basis weight of 50 g/m$^2$ before impregnation. The paper generally may contain impregnant in a range of from about 5 to about 50 percent by weight, on a dry weight basis, although in some cases higher levels of impregnant in the paper may be suitable. As a nonlimiting illustration, the paper may contain 18 parts impregnating solids per 100 parts fiber by weight, and may have a basis weight of 58 g/m$^2$, both on a dry weight basis. A suitable caliper may be 97+/−8 micrometers.

The first surface of the paper is first coated with a first layer of a first synthetic polymeric composition. Thereafter, the coated paper is coated with a second layer of a second synthetic polymeric composition overlaying the first layer. Any conventional synthetic polymeric composition may be utilized for the first synthetic polymeric composition so long as the composition adheres or bonds well to the first surface of the paper. Suitable polymeric compositions for the first layer include, by way of illustration only, polyolefins, especially polyethylene and copolymers of ethylene and one or more of such monomers as vinyl acetate, acrylic acid, methacrylic acid, acrylic acid esters (acrylates), and methacrylic acid esters (methacrylates); copolymers of ethylene with such vinyl monomers as vinyl alcohol, vinyl chloride, and vinylidene chloride; polystyrene and copolymers of styrene with butadiene and acrylonitrile; acrylonitrile-butadiene-styrene terpolymers; polyamides; polyesters, including both homopolymers and copolymers; polyurethanes; and polyether esters. The synthetic polymeric composition can be a thermoplastic material or a thermosetting material. Specific examples include, but are not limited to, polyacrylates such as Hycar® 26106 available from Noveon, nitrile rubbers such as Hycar® 1572 available from Noveon, poly(vinylchloride) such as Vycar® 460X90 available from Noveon, and styrene-butadiene copolymers such as, for example, carboxylated styrene-butadiene copolymer latex emulsions.

The thickness of the first layer required will vary according to the intended use for the coated paper. For example, a thicker first layer normally will be required for coarse grit abrasive products, e.g., abrasives having particle sizes of 200 mesh or greater (the term "mesh" is used herein to mean U.S. Standard Sieve mesh). On the other hand, a thinner first layer may be used for finer grit products which are to be used for polishing or fine surface finishing. A practical minimum layer thickness is about 25 micrometers, whereas the practical maximum layer thickness is about 250 micrometers. However, thinner or thicker layers can be employed, if desired, provided that the layers are continuous. Thermoplastic polymeric compositions which are inherently stiff will be more useful for coarse grit products, while softer or elastomeric thermoplastic polymeric compositions like ethylene-vinyl acetate copolymers and polyurethanes will be more useful for such fine grit products as fine sanding and polishing cloths.

Any conventional synthetic polymeric composition such as described above for the first layer may be utilized for the second synthetic polymeric composition. The synthetic polymeric composition for the first and second layers can be the same or different. Desirably, the second synthetic polymeric composition adheres or bonds well to the surface of the first layer. More desirably, the second synthetic polymeric composition flows sufficiently well to fill any pinholes present in the first layer. For example, synthetic polymeric compositions having viscosities ranging from 30-50 centipoise may be expected to flow sufficiently well to substantially fill any pinholes present in the first layer. Even more desirably, the second synthetic polymeric composition used for the second layer is compatible with the particular adhesive which may be used to attach the adhesive particles to the coated surface of the paper.

In one embodiment, a thermoplastic polymeric composition which is inherently stiff is used for the first layer, while a softer or elastomeric thermoplastic polymeric composition like ethylene-vinyl acetate copolymer and/or polyurethane is used as the second layer for fine grit products such as fine sanding and polishing cloths.

The first and second synthetic polymeric compositions can be applied neat, as a solution in a suitable solvent, or as a dispersion in water or other liquid by methods well known to those having ordinary skill in the art. In some embodiments, processes which apply a viscous, high solids content fluid to the surface of a paper are utilized. Such processes can utilize 100 percent solids compositions which include, by way of illustration only, ultraviolet radiation curable acrylics and liquid epoxy thermosets. Such compositions can be applied with, for example, slot die coaters and knife-over-roll coaters. In addition, thermoplastic powder coating methods can be employed, such as electrostatic coating methods. In other embodiments, processes such as hot melt coating and melt extrusion which apply a molten composition directly to the fabric are employed, particularly where the fabric is exceptionally porous and open in nature. If desired, the synthetic polymeric composition can be preformed into, for example, a film which then can be bonded to the second surface of the paper by heat or an adhesive layer.

After the first and second layers of synthetic polymer composition are applied to the first surface of the paper, the coated paper passes through a calender or supercalender to further smooth the surface of the second layer. The effect of calendering on the surface of the abrasive backing depends upon the temperature, the pressure applied, and the duration of the pressure. For purposes herein, calendering can be carried out at either at ambient or elevated temperatures. Suitable calendering pressures can be from about 50 to about 2000 pounds-force per linear inch (pli), desirably from about 100 to about 1600 pli, more desirably from about 300 to about 1000 pli, and even more desirably from about 400 to about 600 pli. Suitable temperatures can be from about 20° Celsius to about 240° Celsius, desirably from about 20° Celsius to about 140° Celsius, more desirably from about 20° Celsius to about 40° Celsius, though even more desirably the temperatures are at ambient temperature. The duration of calendering can be varied in conjunction with the nip pressure and/or the composition of the calendar rolls to produce the desired smoothness of the paper backing for the sheet. For example, softer calendar rolls such as fiber-filled rolls tend to compress to form a larger contact area in the nip, thus increasing the duration of the calendering. Hard steel rolls compress less, thus decreasing the duration of the calendering. In one arrangement, the calender nip comprises a steel roll and a soft fiber-filled roll. In another arrangement, for example, a production supercalender stack may include more than two rolls, desirably from about nine to about 11 rolls, stacked upon each other in a vertical arrangement. Desirably the stacked rolls alternate between steel and fiber-filled rolls. With such an arrangement, the paper can be exposed to various pressures, up to about 1600 pli, and a number of nips, for example from one to about eight, in order to develop the desired smoothness level.

The resulting two-layer continuous coating provides a smooth, nonporous surface to which abrasive particles can be attached, typically by means of an adhesive coating or layer. The continuous coating also binds the abrasive backing together, giving it resistance to mechanical distortion during conversion of the coated abrasive backing to an abrasive paper and during use of the resulting abrasive paper.

The abrasive backing may include an amorphous, rubbery polymer film layer bonded to the second surface of the paper to reduce the tendency of the paper to curl and provide a non-slip surface. By way of example only, the amorphous, rubbery polymer may be a polyester elastomer. As another example, the amorphous, rubbery polymer may be an amorphous, rubbery polypropylene. The amorphous, rubbery polymer film layer in general may be formed on the second surface of the paper by melt-extrusion or extrusion-casting techniques which are well known to those having ordinary skill in the art. Alternatively, a preformed film of the amorphous, rubbery polymer may be bonded to the second side of the paper, again by known means. In general, the amorphous, rubbery polymer film layer may be of any desired thickness, depending upon the requirements of the abrasive paper. For example, the amorphous polymer film layer may have a thickness of from about 5 to about 75 micrometers. As another example, the amorphous polymer film layer may have a thickness of from about 12 to about 25 micrometers.

To attach abrasive particles to the coated surface of the abrasive backing, an adhesive is applied to the smooth, coated surface of the abrasive backing. Any of the known types of adhesives can be used to bond the abrasive particles to the second layer of synthetic polymeric composition. For example, the adhesive may be thermosetting adhesive, such as, by way of illustration only, epoxy resins, epoxy esters, phenolics, polyurethanes, polyesters, and alkyds. Water-based dispersions such as an ammonia-dispersed ethylene-vinyl acetate copolymer also can be employed. The selection of adhesive typically is dictated by the end use, but the adhesive must be compatible with the synthetic polymeric coating over which it is applied. Phenolics are most useful for very tough, coarse abrasive products for rough finishing or shaping, especially where the product needs to be waterproof as well. More flexible adhesives such as epoxy resins and alkyds are also waterproof and are desirable for fine-finishing products. For dry sanding products, animal glues and water based synthetic resins may be used.

Any generally accepted means of applying adhesive to a sheet material can be employed, including such methods as roll, reverse roll, gravure, and Meyer rod coating. It generally is desirable to avoid placing the paper under significant tension in order to minimize paper distortion, especially when the adhesive is being heat cured. Curing temperatures desirably will be kept below about 125 degree Celsius, as higher temperatures also tend to distort the paper.

In general, any of the commonly employed abrasive materials known to those having ordinary skill in the art can be used. Such materials can vary from very coarse to very fine. Exemplary abrasive materials include silicon carbide, aluminum oxide, garnet, and diamond, by way of illustration only.

In one embodiment, the bonding adhesive may be dissolved or dispersed in a solvent or carrier and the mixture is then applied by a pressure coating nip to the abrasive backing. The abrasive grit particles are then deposited on the moving abrasive backing before the solvent or carrier is driven off, and while the adhesive is still fluid. The grit particles may be oriented or aligned, for example by electrostatic means, to maximize abrasive or cutting properties. Desirably, no external pressure is applied to the particles after deposition, as this may tend to destroy the alignment of particles, or bury the particles in the backing, both of which are undesirable. After the solvent or carrier is driven off, the abrasive backing carrying the adhesive and grit may be passed through an oven which heats the material for times ranging from several minutes to several hours to cure the adhesive and to firmly bond the grit therein.

If desired, one or more layers of an adhesive or other material can be formed over the layer of abrasive particles. Such a layer can serve to better anchor all of the abrasive particles to the abrasive sheet material, thereby reducing abrasive loss during use and increasing the life of the abrasive sheet material.

In general, any of the commonly employed abrasive materials known to those having ordinary skill in the art can be used. Such materials can vary from very coarse to very fine. Exemplary abrasive materials include silicon carbide, aluminum oxide, garnet, and diamond, by way of illustration only.

If desired, one or more layers of an adhesive or other material can be formed over the layer of abrasive particles. Such a layer can serve to better anchor all of the abrasive particles to the abrasive sheet material, thereby reducing abrasive loss during use and increasing the life of the abrasive sheet material. For example, after the grit is firmly bound to the backing, a "grain size" coating may be applied over the layer of abrasive particles. The grain size coating may be a hard, thermosetting resin or animal glue which anchors the particles more firmly so that they remain aligned for maximum cutting ability.

Test Procedures

Representative samples of coated papers were tested under standard TAPPI conditions at a relative humidity of 50±2% and a temperature of 23±2° C. after conditioning for 24 hours according to the test procedures outlined below.

Basis Weight: Basis weight is a measure of the weight per unit area of the paper as described in TAPPI Test Method T-410. To determine basis weight, paper having a known area is weighed on a precision scale and the weight per unit area expressed in grams per square meters is calculated. An A&D Model HR 60 Electronic Precision Balance manufactured in 2001 by A&D Weighing from Milpitas, Calif. and accurate to three decimal places was used to weigh the specimens.

Caliper: Caliper is a measure of the thickness of the paper as described in TAPPI Test Method T-411. A Series "400" Precision Micrometer manufactured by Testing Machines Incorporated (TMI) of Amityville, N.Y. was utilized to determine. A pre-conditioned sample is inserted in the instrument and a digital read-out displays the sample thickness.

Tensile: Tensile strength is a measure of the force per unit width required to break a paper specimen as described in TAPPI Test Method T-494. An EJA Tensile Tester manufactured in 1999 by Thwing-Albert of Philadelphia, Pa. was used to measure the tensile and stretch properties. A 15 millimeter-wide sample is inserted into the 4 inch jaw span and the sample is pulled at a jaw speed of 12 inches per minute. The peak tensile strength and stretch is displayed on a electronic readout CRT display. Test results for four samples were averaged to determine the test value.

Stretch: Stretch is a measure of the percentage elongation at break when a specimen is subjected to a tensile test as described in TAPPI Test Method T-494. Stretch was measured as indicated above for the tensile test.

Tear: Tear strength is a measure of the force perpendicular to the plane of the paper required to tear through a specific distance after the tear has been started using an Elmendorf Tear tester as described in TAPPI Test Method T-414. A ProTear Elmendorf Tear Tester manufactured in 1998 by Thwing-Albert was used to measure the tear strength of the paper samples. Samples having width of exactly 63 millimeters are placed in the jaws of the tester and clamped. An initial 20 millimeter slit is made using a knife across the sample leaving a 43 millimeter long tear path. A pendulum is released which results in the sample tearing. The work done in tearing the sample is displayed on a digital read-out. Test results for four samples were averaged to determine the test value.

Haggerty Smoothness: Haggerty smoothness is determined by measuring the airflow between a specimen and a pressurized ring that is pressed onto a coated paper as described in TAPPI Test Method T-538. The rate of flow is related to the surface roughness of the coated side of the paper. A Model 538 Paper Smoothness Tester manufactured in 1997 by Technidyne Corporation from New Albany, Ind. was used to conduct the test. A sample is inserted into the automated instrument and a digital readout expresses the flow rate of air in cubic centimeters per second.

Bekk Smoothness: Bekk smoothness is determined by measuring the time for 38 milliliters of air to pass through a ring pressed onto the coated paper as described in TAPPI Test Method T-479. This test is more suitable for very smooth papers. The Bekk Smoothness tester used in this study is a Model K533 manufactured by Messmer Büchel of The Netherlands in 1999. It is an electronic model which involves placing the sample onto a glass plate for testing. The test instrument automatically measures the time for a fixed volume of air to pass between the glass plate and the sample. Test results for ten samples were averaged to determine the test value.

Haggerty Porosity: Haggerty porosity is a measure of the resistance of paper to passage of air through the plane of the paper as described in TAPPI Test Method T-536. A Model 1 Porosity Tester manufactured by Technidyne Corporation in 2000 was used for testing the samples. The sample is placed in a slot between the base and the cabinet housing of the instrument. After running the test, a digital read-out displays the flow rate of air through the paper in cubic centimeters per second. Test results for four samples were averaged to determine the test value.

EXAMPLE

The paper used in this example was a commercially available saturated paper (Blue "A" weight, Neenah Paper, Inc., Alpharetta, Ga.). Sheet size was 8.5.times.11 inches (about 22.times.28 cm). The basis weight of the paper before saturation was about 62 grams per square meter (gsm). The saturant was nitrile-butadiene rubber latex and was present at a level sufficient to give the saturated paper a basis weight of 90 gsm.

Figure 2:
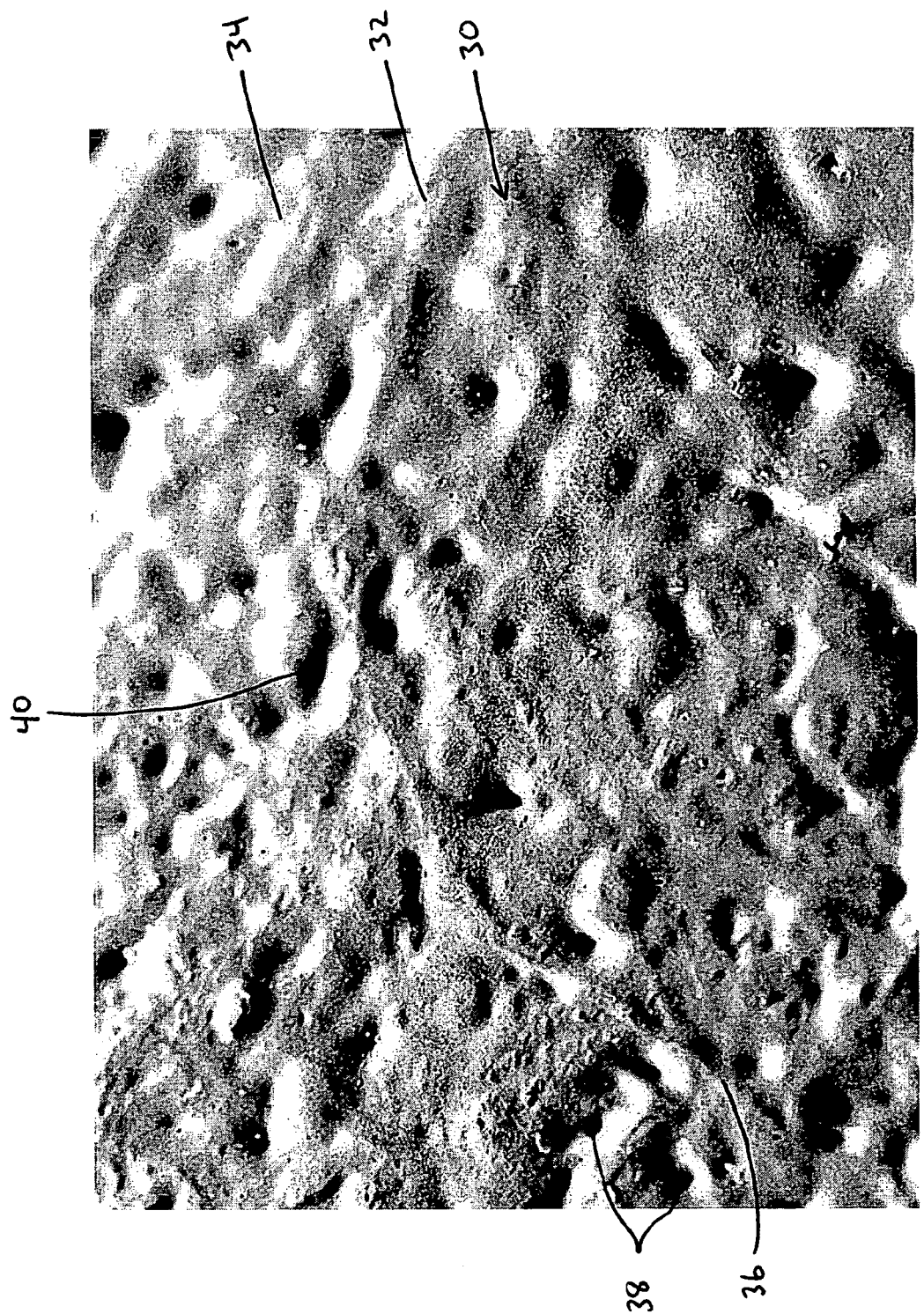
FIG. 2 is a photomicrograph of the coated surface of a double coated abrasive backing.

An aqueous mixture of nitrile and polyvinyl chloride lattices at a viscosity of 40 centipoise and 49% total solids was applied to the wire side of the paper with a number 18 Meyer wire-wound rod and the paper was dried in a 105 C. oven. The amount of the coating applied was determined to be 13 gsm by gravimetric analysis after drying. A second layer of approximately the same coat weight was applied directly over the first in a similar manner and the paper was dried again. The paper smoothness was tested and found to be significantly smoother than that obtained on a single layer control sample as measure by Haggerty and Bekk Smoothness instruments. Subsequent calendaring of the sample between a steel calendar roll and a fiber-filled roll at 500 pli and 23° degrees C. resulted in smoothness values typically associated with that of film as measured by these instruments. FIG. 1 is a photomicrograph (approximately 100× linear magnification) of a surface 12 of a single coating abrasive paper 10 made as described above. A coating 14 covering the surface 12 of the paper fibers 16 contains many pinholes 18 and gaps 20. FIG. 2 is a photomicrograph (approximately 100× linear magnification) of a surface 32 of a double coating abrasive paper 30 made as described above. A coating 34 covering the surface 32 of the paper fibers 36 contains many pinholes 38 and gaps 40. Compared to the single coating abrasive paper 10, the double coating abrasive paper 30 has a smoother appearance with fewer and smaller pin holes and gaps present in the surface of the paper. Physical property test results for the single coating and the double coating abrasive backings are provided in Table 1. Of particular note is the marked improvement in the smoothness of the double coating, supercalendered paper.

TABLE 1

| Physical Properties | | Single layer paper | Double layer paper |
|---|---|---|---|
| Basis Weight, gsm | | 115 | 123 |
| Caliper, mm | | 0.167 | 0.145 |
| Dry Tensile, kg/15 mm | MD | 9.0 | 8.4 |
| | CD | 4.6 | 6.6 |
| Dry Stretch, % | MD | 3.6 | 4.0 |
| | CD | 11.7 | 10.4 |
| Tear, gms | MD | 95 | 93 |
| | CD | 105 | 92 |
| Haggerty Smoothness, cc/sec. | | 190 | 27 |
| Bekk Smoothness, sec./38 ml | | 45 | 1400 |
| Sheffield Porosity, cc/sec. | | 0 | 0 |

Other samples were prepared in a similar manner in which the first and second layer coat weights were varied. A heavier first layer coat weight, approximately 22-26 gsm followed by a 12 gsm top layer resulted in Bekk Smoothness values of over 12,900 second which is the upper limit of the instrument. Photomicrographs confirmed that the second layer of coating eliminated pinholes in the abrasive backing.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged either in whole or in part. Furthermore, those of ordinary skill in the art will appreciate that the foregoing description is by way of example only, and is not intended to limit the invention so further described in such appended claims.

The invention claimed is:

1. A method of making an abrasive paper comprising an abrasive backing having a smooth surface comprising the steps of:
   providing a paper having a first paper surface and a second paper surface;
   applying a first synthetic polymeric layer comprising a first synthetic polymeric composition to the first paper surface;
   thereafter applying a second synthetic polymeric layer comprising a second synthetic polymeric composition to the first synthetic polymeric layer;
   supercalendering the abrasive backing to form a smooth surface on the second polymeric layer; and
   applying a layer of uniformly distributed abrasive particles to the second synthetic polymeric layer.

2. The method of claim 1, wherein the smooth surface exhibits a Bekk Smoothness greater than about 100.

3. The method of claim 1, wherein the smooth surface exhibits a Bekk Smoothness greater than about 1000.

4. The method of claim 1, further comprising the step of applying an amorphous, rubbery polymer film layer to the second paper surface.

5. The method of claim 4, wherein the amorphous rubbery polymer film layer is produced from melt-extrusion, extrusion casting or a preformed film and is selected from the group consisting of polyester elastomers and amorphous rubbery polypropylene.

6. The method of claim 1, wherein the paper is a polymer-reinforced paper.

7. The method of claim 1, wherein the paper is saturated with a nitrile-butadiene rubber latex.

8. The method of claim 1, wherein the abrasive particles average less than about 6 microns in size.

9. The method of claim 1, wherein the layer of abrasive particles is bonded to the second synthetic polymeric composition by means of a layer of an adhesive.

10. The method of claim 1, in which the layer of abrasive particles is coated with a layer of an adhesive.

11. The method of claim 1, wherein the first synthetic polymeric composition comprises nitrile and polyvinyl chloride lattices.

12. The method of claim 1, wherein the second synthetic polymeric composition comprises nitrile and polyvinyl chloride lattices.

13. The method of claim 1, wherein the basis weight of the second layer is less than about half the basis weight of the first layer.

14. A fine grit abrasive paper, having an abrasive backing comprising a paper having first and second surfaces, a first layer comprising a first synthetic polymer composition contacting the first surface of the paper, a second layer applied thereafter comprising a second synthetic polymer composition, the second layer contacting the first layer and comprising a smooth exterior surface that exhibits a Bekk Smoothness greater than about 100.

15. The fine grit abrasive paper of claim 14, wherein the smooth surface exhibits a Bekk Smoothness greater than about 1000.

16. A fine grit abrasive paper comprising an abrasive backing comprising a paper having first and second surfaces, a first layer comprising a first synthetic polymer composition contacting the first surface of the paper, a second layer comprising a second synthetic polymer composition, wherein the second layer contacts the first layer and comprises a smooth exterior surface exhibiting a Bekk Smoothness greater than about 1000, and a layer of fine grit abrasive particles having an average particle size less than about 6 microns water.

17. The fine grit abrasive paper of claim 14, further comprising an amorphous rubbery polymer film layer contacting said second surface which demonstrates antislip properties when either dry or wet, and further wherein the abrasive backing is curl-resistant upon exposure to liquid water.

* * * * *

UNITED STATES PATENT AND TRADEMARK OFFICE
CERTIFICATE OF CORRECTION

PATENT NO. : 7,497,884 B2
APPLICATION NO. : 11/027241
DATED : March 3, 2009
INVENTOR(S) : Lindquist et al.

Page 1 of 1

It is certified that error appears in the above-identified patent and that said Letters Patent is hereby corrected as shown below:

Column 10, Line 52 "...about 6 microns water." should read --...about 6 microns.--

Signed and Sealed this

Twelfth Day of May, 2009

JOHN DOLL
*Acting Director of the United States Patent and Trademark Office*